United States Patent

[11] 3,568,581

| [72] | Inventors | Rolf Heinzmann<br>Stuttgart-bad, Cannstatt;<br>Albert Stieringer, Calmbach, Germany |
|---|---|---|
| [21] | Appl. No. | 757,673 |
| [22] | Filed | Sept. 5, 1968 |
| [45] | Patented | Mar. 9, 1971 |
| [73] | Assignee | Robert Bosch Elektrenik Und Photokino GmbH<br>Stuttgart-Unterturkheim, Germany |
| [32] | Priority | Sept. 8, 1967 |
| [33] | | Germany |
| [31] | | P 15 97 120.7 |

[54] PHOTOGRAPHIC APPARATUS WITH BUILT-IN EXPOSURE METER
11 Claims, 5 Drawing Figs.

[52] U.S. Cl. .................................................. 95/10,
95/31, 352/141
[51] Int. Cl. .................................................... G03b 19/04,
G03b 19/18
[50] Field of Search ............................................ 95/10 (C),
31, 64 (D); 352/72, 78, 141

[56] References Cited
UNITED STATES PATENTS

| 3,156,171 | 11/1964 | Sakaki | 95/64(D) |
| 3,266,398 | 8/1966 | Kremp et al. | 95/10(C)(X) |
| 3,410,187 | 11/1968 | Kaneko | 95/31(X) |
| 3,444,798 | 5/1969 | Mayr et al. | 352/72(X) |
| 3,461,782 | 8/1969 | Katsuyama | 95/10(C) |
| 3,464,334 | 9/1969 | Wilharm et al. | 95/10(C) |

*Primary Examiner*—John M. Horan
*Assistant Examiner*—Joseph F. Peters, Jr
*Attorney*—Michael S. Striker ABSTRACT: A photographic camera, which utilizes film-containing magazines having coding markers indicative of the film sensitivity, is provided with a built-in exposure meter which is adjusted by a detector serving to scan the coding marker of a magazine in the camera housing and to thereby adjust the exposure meter as a function of sensitivity of the respective film. The circuit of the exposure meter contains a normally operative variable resistor or a normally closed control switch which is opened by the detector when the detector assumes an end position while the magazine chamber of the camera housing is empty. The circuit of the exposure meter can be completed while the magazine chamber is empty by a locking member which can lock or unlock the door of the film chamber when the door is closed. When the door is closed and the locking member is moved to inoperative position to permit opening of the door, the locking member automatically causes the detector to leave its end position and to thus permit closing of the control switch or return movement of the slider in the variable resistor into engagement with the fixed portion of such resistor. This enables the operator to test the exposure meter while the magazine chamber is empty.

Patented March 9, 1971

INVENTORS:
ROLF HEINZMANN
ALBERT STIERINGER

BY
Michael S. Striker
their ATTORNEY

Patented March 9, 1971

INVENTORS
ROLF HEINZMANN
ALBERT STIERINGER

BY Michael S. Striker their ATTORNEY 3,568,581

1

PHOTOGRAPHIC APPARATUS WITH BUILT-IN EXPOSURE METER

BACKGROUND OF THE INVENTION

The present invention relates to photographic apparatus in general, and more particularly to improvements in motion picture cameras or still cameras having a built-in exposure meter which can automatically adjust a diaphragm and/or a shutter as a function of scene brightness. Still more particularly, the invention relates to improvements in cameras wherein the initial setting of the built-in exposure meter can be automatically adjusted as a function of the sensitivity of film in a magazine or cassette which is accommodated in or mounted on the housing of the camera. Such magazines are normally provided with coding means, e.g., in the form of notches or shoulders adapted to be scanned by a detector which automatically adjusts the exposure meter in accordance with the sensitivity of film in the thus scanned magazine.

Austrian Pat. No. 213,698 discloses a camera wherein the circuit of the exposure meter is automatically deenergized when the magazine is removed from the camera housing. This is intended to save electrical energy. The circuit includes a switch which is normally open but closes in automatic response to proper insertion of a magazine. An index which is observable in the view finder assumes a predetermined zero position when the magazine is removed from the camera housing, i.e., when the circuit of the exposure meter is deenergized, to thus indicate to the operator the absence of the magazine and the inoperative condition of the exposure meter.

German DAS No. 1,229,381 discloses a somewhat modified camera wherein the coding marker on the magazine operates a device which normally deenergizes the circuit of the exposure meter. Thus, the circuit can be completed only when a magazine having a coding marker thereon is properly inserted into the camera housing.

A drawback of the just outlined cameras in that their exposure meters cannot be readily operated or tested when the magazine is removed. For example, it is often desirable to test the exposure meter when the camera is about to be used after a longer period of storage. In conventional cameras, the exposure meter circuit can be completed only if the operator uses his fingers or a suitable tool in order to change the position of the member which closes the switch or otherwise completes the circuit in response to insertion of a magazine. This is a time-consuming and tedious procedure because the aforementioned member is normally concealed in the interior of the housing and is not readily accessible. Moreover, a careless, clumsy or inexperienced operator is likely to damage the delicate mechanism if he can find the circuit completing member at all.

SUMMARY OF THE INVENTION

One of the objects of our invention is to provide a photographic camera wherein the initial setting of the built-in exposure meter is automatically selected as a function of film sensitivity when a magazine is properly inserted into the camera housing, and to provide the camera with simple, compact and reliable means for permitting completion of the exposure meter circuit when the magazine is removed from its chamber.

Another object of the invention is to provide a camera wherein such completion of the exposure meter circuit in the absence of a magazine in the film chamber can be carried out by a member or a group of members which also perform one or more additional important functions.

A further object of the invention is to provide a motion picture camera with simple means for indicating the presence or absence of a magazine in the film chamber and/or the condition of the exposure meter circuit.

Still another object of the invention is to provide a camera which embodies the aforediscussed novel features and wherein the built-in exposure meter may be of the type which automatically returns its output member to starting position in response to deenergization of its circuit or wherein the output member simply dwells in its last position when the circuit is deenergized.

A concomitant object of the invention is to provide a photographic camera with a novel detector which scans the coding means of magazines for film and which can also effect energization or deenergization of the exposure meter circuit.

The invention is embodied in a photographic apparatus for use with magazines of the type provided with coding means indicative of the sensitivity of film therein. The apparatus comprises a housing or body including a magazine chamber, adjustable exposure meter means provided in the housing and arranged to assume an operative or an inoperative condition, detector means movable by the coding means of a magazine in the chamber from a starting position to one of a plurality of intermediate positions in each of which the detector means adjusts the exposure meter means as a function of the sensitivity of film in the magazine which happens to be accommodated in the chamber, the detector means being further movable to an end position when the magazine chamber is empty, control means operated by the detector means to place the exposure meter means into operative condition in the starting and intermediate positions of the detector means and to place the exposure meter means into inoperative condition in response to movement of the detector means to its end position, and manually operated means for moving the detector means from its end position when the magazine chamber is unoccupied.

The housing is preferably provided with a door which can permit or prevent access to the magazine chamber by being movable between open and closed positions. The aforementioned manually operated means preferably comprises a locking member which can be manipulated by hand to lock or unlock the door in closed position and the detector means can be moved from its end position to one of its other positions in response to unlocking of the door so that the exposure meter means is then in operative condition even though the magazine chamber is empty.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
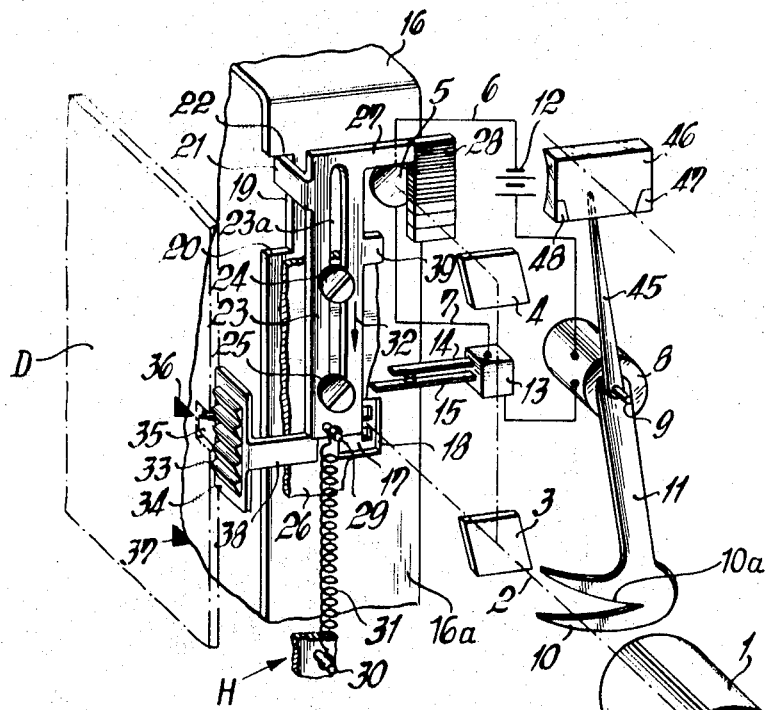
FIG. 1 is a fragmentary perspective view of a motion picture camera which embodies one form of our invention, a film-containing magazine being shown in the film chamber, the door of the film chamber being held in closed but unlocked position and the detector being shown in starting position.

FIG. 1 illustrates a portion of a motion picture camera which comprises an objective 1 whose optical axis is shown at 2. This objective directs scene light against a partially light-transmitting mirror 3 which permits some light to reach an unexposed film frame and deflects the remaining light against a second mirror 4. The latter directs the thus deflected light against a photoelectric receiver 5 (preferably a resistor) forming part of an exposure meter which is built into the housing H of the camera. The circuit of the exposure meter includes conductors 6, 7 which are connected to the receiver 5 and respectively contain an energy source 12 (e.g., one or more batteries) and a normally closed control switch 13. These conductors are further connected to the winding of a customary light meter 8 (e.g., a moving-coil instrument) having a rotary output member 9 supporting an arm 11 which carries a simple diaphragm 10. The latter has a substantially horn-shaped notch or cutout 10a and can move across the optical axis 2 to determine the amount of light which can reach the mirror 3 and hence the unexposed film frame as well as the photoelectric receiver 5. The control switch 13 has a fixed contact 14 and a movable contact 15 which normally engages the fixed contact 14 to thereby complete the circuit and to thus place the exposure meter in operative condition.

The housing H of the camera includes a wall member 26 which forms part of a magazine chamber adapted to receive magazines or cassettes 16 for motion picture film 17. One marginal portion of the film 17 is formed with a row of customary perforations which can be engaged by a conventional claw pulldown or another suitable film transporting device, not shown. Such pulldown can reach the perforations of film 17 through a window 18 which is provided in the front panel 16a of the magazine 16 and registers with the objective 1 and mirror 3 when the magazine is properly inserted into the chamber. In the illustrated embodiment, the film 17 is an 8-millimeter film. The motor which drives the aforementioned claw pulldown and operates the shutter is not shown in the drawing. The front panel 16a of the magazine 16 is formed with a rectangular notch 19 which is located at a level above the window 18 and is machined or otherwise formed in an edge portion of such panel. The shoulder 20 which flanks the lower end of the notch 19 constitutes a coding means or marker and its position with reference to the shoulder or stop 22 at the upper end of the notch 19 is indicative of the sensitivity of film 17 in the magazine 16. The position of the marker 20 can be determined by a movable scanner 21 which serves as a means for adjusting the exposure meter as a function of the sensitivity of film in that magazine which is inserted into the magazine chamber. In the magazine which is shown in the drawing, the sensitivity of film 17 therein is indicated by the distance between the marker 20 and stop 22. Such distance is greater in magazines which contain film of lesser sensitivity and is relatively short when the sensitivity of film is high. The magazine 16 is assumed to contain film 17 of lowest sensitivity, i.e., each magazine containing a film of another sensitivity has a notch which is shorter than the notch 19 of FIG. 1.

The aforementioned scanner 21 constitutes a bentover lug of a platelike reciprocable detector 23 provided with an elongated vertical slot 23a for the stems of two guide members 24, 25, preferably two screws which mesh with the aforementioned wall member 26 of the magazine chamber. The maximum stroke of the detector 23 exceeds the length of the longest notch 19. The detector 23 is further provided with an arm 27 which supports a grey filter 28 having portions or zones of different light transmissivity. This filter 28 is movable in front of the photoelectric receiver 5, i.e., across the path of light which is reflected by the mirror 4. The density or light transmissivity of each portion of the filter 28 corresponds to a different initial adjustment of the exposure meter and the arrangement is such that light reflected by the mirror 4 passes through the portion of maximum transmissivity (minimum density) when the detector 23 assumes a position corresponding to that position of the scanner 21 which is indicative of a film of maximum sensitivity. Thus, and since the film 17 shown in FIG. 1 is one of minimum sensitivity, the detector 23 maintains the arm 27 in a position in which the filter portion of minimum transmissivity extends across the path of light between the mirror 4 and photoelectric receiver 5. Consequently, the receiver 5 receives more light when the sensitivity of film in that magazine which is accommodated in the film chamber is high; the receiver 5 then causes the diaphragm 10 to assume an angular position in which the latter reduces the amount of scene light reaching the mirror 3. Of course, the position of the diaphragm 10 changes independently of the position of the scanner 21 in response to a change in the intensity of scene light. In other words, the setting of the diaphragm 10 is an initial setting which is selected as a function of the sensitivity of film 17 in the magazine 16.

The camera further comprises means for permanently biasing the detector 23, and hence the scanner 21 and filter 28, to an end position. Such means comprises a helical spring 31 one end of which is attached to a post 29 at the lower end of the detector 23 and the other end of which is attached to a post 30 fixed to the camera housing H. The direction in which the detector 23 is biased by the spring 31 is indicated by arrow 32. FIG. 1 illustrates the detector 23 in the upper end position or starting position, i.e., the spring 31 stores a maximum amount of energy and biases the lower edge face of the detector against an actuating or locking member 38 which can be manipulated by hand. Such starting position of the detector 23 corresponds to that position of the scanner 21 which is indicative of a film with maximum sensitivity. The aforementioned actuating or locking member 38 is provided with a handgrip portion or knob 34 having a serrated surface 33 so that it can be readily engaged by a finger to be moved up or down. An index 35 of the knob 34 can be moved into registry with either one of two vertically spaced reference marks 36, 37 which are provided at the outer side of a movable wall or door D. The purpose of the locking member 38 is to lock or unlock the door D when the latter assumes a closed position to thereby prevent access to the magazine chamber. When the index 35 registers with the lower reference mark 37, the door D is locked in closed position. When the index 35 registers with the upper reference mark 36, the door is unlocked and can be moved from closed to open position to afford access to the magazine 16 in the chamber. The distance between the reference marks 36, 37 exceeds the maximum stroke of the detector 23 and hence also the distance between the marker 20 and stop 22 in a notch 19 of maximum length. In the illustrated position, the locking member 38 bears against the lower edge face of the detector 23 and holds this detector in the starting position in which the spring 31 is expanded and the scanner 21 is remote from the marker 20. It is preferred to provide the locking member 38 with a detent device (not shown) which holds it in the illustrated position but permits downward movement in response to application of finger pressure against the knob 34. Thus, the detent device is effective when the index 35 registers with the reference mark 36.

The detector 23 is provided with a further arm or extension 39 which constitutes a trip and can move the contact 15 of the control switch 13 away from contact 14 in response to downward movement of the detector under the action of the spring 31. The positions of the trip 39 and control switch 13 are selected in such a way that the contact 15 is moved away from the contact 14 only when the magazine chamber is empty and when the detector 23 is moved to its (lower) end position upon closing of the aforementioned door D which affords access to the magazine chamber. The index 35 of the knob 34 then registers with the lower reference mark 37. The distance which the trip 39 must cover in order to disengage the contact 15 from the contact 14 exceeds the maximum length of a notch 19 so that the control switch 13 can be opened only when the magazine is removed from the chamber, when the door is closed and when the locking member 38 is moved to the lower end position. In each such intermediate position of the detector 23 which is determined by the marker 20 of a magazine 16 in the film chamber, the trip 39 is located at a level above the movable contact 15 so that the control switch 13 is closed and the exposure meter is in operative condition because the circuit including the parts 5, 6, 7, 8, 12, 13 is completed. The length of the guide slot 23a in the detector 23 is selected in such a way that the trip 39 can engage and displace the contact 15 when the detector is free to follow the bias of the spring 31 and to move the index 35 into registry with the lower reference mark 37.

The operation:

When the door of the magazine chamber (including the wall member 26) is unlocked, the aforementioned detent mechanism maintains the locking member 38 in the illustrated upper end position so that the index 35 registers with the upper reference mark 36. The position of the scanner 21 is then indicative of a film with maximum sensitivity. The spring 31 stores energy and the control switch 13 is closed, i.e., the circuit of the exposure meter is completed and the effective aperture defined by the diaphragm 10 is a function of scene light. The magazine chamber of the camera is ready to receive a magazine 16.

Figure 2:
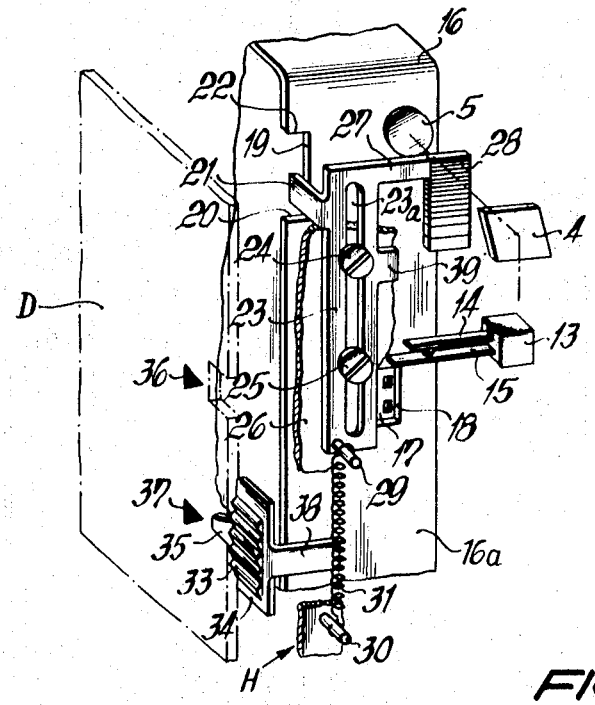
FIG. 2 is a similar perspective view and illustrates the detector of the camera in one of its intermediate positions in which the detector adjusts the exposure meter as a function of the sensitivity of film in the inserted magazine.

When the magazine is properly inserted into the chamber and the door D is closed, the operator moves the knob 34 downwardly to overcome the retaining action of the detent mechanism whereby the index 35 advances toward and into registry with the lower reference mark 37. The spring 31 contracts and moves the detector 23 downwardly, i.e., the lower edge face of the detector continues to bear against the locking member 38 until the scanner 21 reaches the marker 20 in the coding notch 19 of the inserted magazine 16. Such intermediate position of the detector 23 is shown in FIG. 2. The detector then maintains the filter 28 in a position in which a filter portion of predetermined density extends across the path of light between the mirror 4 and the photoelectric receiver 5, i.e., the initial setting of the diaphragm 10 is a function of sensitivity of that film 17 which is accommodated in the freshly inserted magazine 16. The trip 39 is located at a level above the movable contact 15 so that the control switch 13 remains closed.

When the film in the inserted magazine is exposed, or when the operator wishes to replace the inserted magazine with another magazine, the knob 34 of the actuating member 38 is returned to the position shown in FIG. 1, i.e., its index registers with the reference mark 36 and the door D is unlocked so that the magazine chamber is accessible. The door D is either pivotably or removably mounted on the housing H. The spring 31 again stores energy but the aforementioned detent mechanism holds the locking member 38 against movement away from the position shown in FIG. 1. Such position of the locking member corresponds to that position of the scanner 21 which is indicative of a film with maximum sensitivity. The detector 23 maintains the filter 28 in a position in which the filter portion of minimum density extends across the path of light between the mirror 4 and photoelectric receiver 5.

If the operator thereupon moves the knob 34 downwardly while the magazine chamber remains empty, the spring 31 is free to move the detector 23 to the lower end position, i.e., if the guide member 24 permits it, the lower edge face of the detector 23 can bear against the locking member 38 at the time when the index 35 registers with the lower reference mark 37. This enables the trip 39 to reach and to displace the movable contact 15 so as to open the control switch 13 and to deenergize the circuit of the exposure meter, i.e., the exposure meter is then in inoperative condition. Such lower end position of the detector 23 is preferably determined by the upper guide member 24 which then abuts against the surface in the upper end of the slot 23a (see FIG. 3). Thus, the member 24 constitutes a fixed stop which automatically arrests the detector 23 in the lower end position. Of course, the detector 23 can be arrested by a separate stop or simply by the locking member 38. The light meter 8 is provided with a customary spring (not shown) which automatically moves the output member 9 (and hence the diaphragm 10) to a zero position when the circuit of the exposure meter is deenergized.

Figure 3:
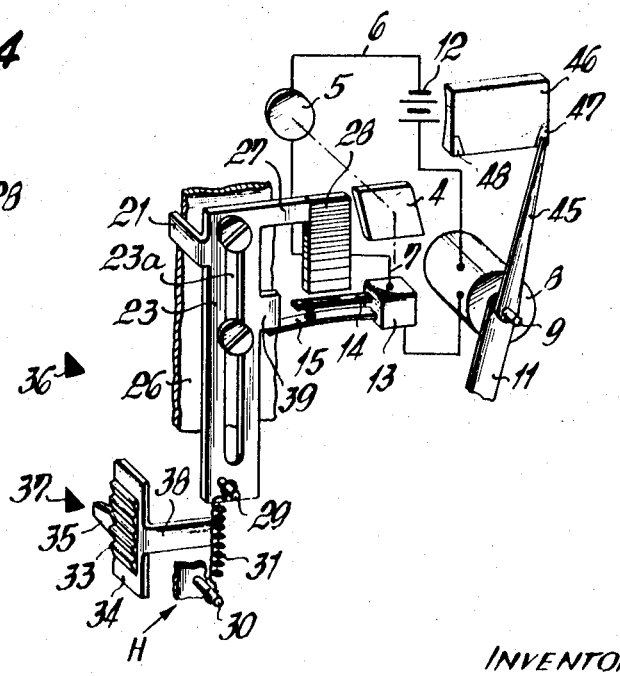
FIG. 3 is a similar perspective view and illustrates the detector in an end position it assumes when the film chamber is empty and the door of the film chamber is locked in closed position.

If the operator of the camera wishes to use the exposure meter at a time when the magazine chamber is empty, the locking member 38 is simply moved upwardly and away from the position shown in FIG. 3 so that the detector 23 leaves its lower end position and moves its trip 39 away from the contact 15. The control switch 13 closes and completes the circuit of the exposure meter. If the locking member 38 is returned all the way to the position shown in FIG. 1, the starting position of the scanner 21 is indicative of a film with maximum sensitivity. The circuit of the exposure meter is deenergized again when the operator returns the locking member 38 to the position shown in FIG. 3. This is the normal position of the locking member when the magazine chamber is empty. In this way, the circuit of the battery 12 is open.

The output member 9 of the light meter 8 further carries a pointer or needle 45 which is movable behind a lens 46 of the view finder. The lens 46 carries two symbols 47, 48. When the circuit of the exposure meter is deenergized because the trip 39 disengages the movable contact 15 from the fixed contact 14 of the control switch 13, the aforementioned return spring of the light meter 8 causes the needle 45 to register with the symbol 47 (see FIG. 3). Thus by looking through the view finder and by noticing that the needle 45 is in registry with the symbol 47, the operator learns that the magazine chamber is empty and that the circuit of the exposure meter is deenergized. If the needle 45 registers with the symbol 48, the intensity of scene light is unsatisfactory. The needle 45 constitutes a simple indicating device enabling the operator to determine the presence or absence of a magazine and the condition of the exposure meter.

Figure 4:
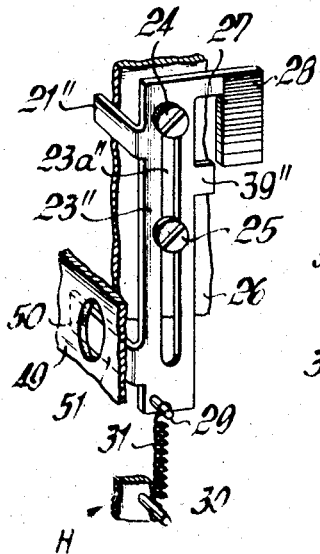
FIG. 4 is a fragmentary perspective view of a modified camera wherein the means for indicating the condition of the exposure meter includes a portion of the detector.

Many motion picture cameras employ exposure meters whose output members are not biased by return springs so that they do not change positions in response to deenergization of their circuits. In order to insure that the operator of such a camera can determine whether or not the circuit of the exposure meter is completed, the detector 23 of FIGS. 1 to 3 may be replaced by a detector 23'' of the type shown in FIG. 4. A sidewall 49 of the camera housing has an observation window 50 and the detector 23'' has an extension 51 which registers with the window 50 when the trip 39'' opens the control switch (not shown). The scanner of the detector 23'' is shown at 21''. The extension 51 registers with the window 50 only when the locking member 38 (not shown) assumes the position shown in FIG. 3 and when the magazine chamber is empty so that the guide member 24 abuts against the surface at the upper end of the slot 23a'' in the detector 23''. Thus, the extension 51 constitutes a modified pointer which replaces the pointer 45 of FIGS. 1 and 3. The operator knows that the magazine chamber contains a magazine and that the circuit of the exposure meter is completed if the pointer 51 does not register with the observation window 50.

Figure 5:
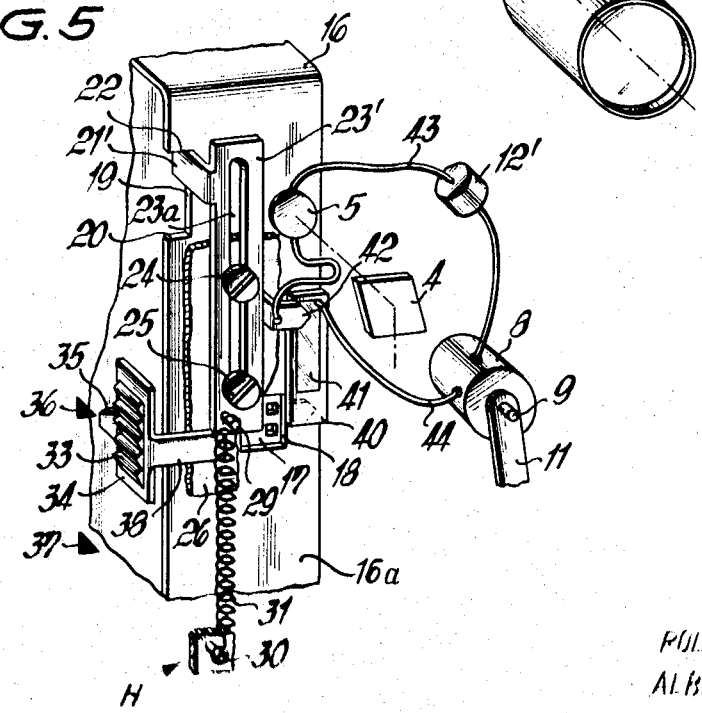
FIG. 5 is a fragmentary perspective view of a third camera wherein the detector carries a portion of a variable resistor which serves as a control means to determine the initial setting of the exposure meter as a function of film sensitivity.

Referring finally to FIG. 5, there is shown a portion of a third motion picture camera wherein the filter 28 and the control switch 13 of FIGS. 1 to 3 are replaced by a modified control means which serves to effect initial adjustment of the exposure meter as a function of sensitivity of film which is accommodated in the magazine chamber and also to change the condition of the exposure meter. The modified control means comprises a combination variable resistor and switch including a platelike supporting member or carrier 40 of insulating material which is fixedly mounted in the housing of the camera and carries a current-conducting layer 41 of carbon. A slider 42 of the variable resistor is connected with and is movable by the detector 23' to travel along the layer 41 and to thereby change the resistance of the variable resistor in dependency on the position of the scanner 21'. The length of the layer 41 equals the length of the maximum stroke of the scanner 21' when the magazine chamber accommodates a magazine 16. The slider 42 is connected with one pole of the energy source 12' by a conductor 43 which contains the photoelectric receiver 5. The upper end of the layer 41 is connected with a second conductor 44 which contains the coil of the light meter 8.

When the magazine chamber is empty and the locking member 38 is maintained in the upper end position (shown in FIG. 5) in which the index 35 registers with the upper reference mark 36, the slider 42 engages the layer 41 at a point close to the conductor 44 so that the resistance of the variable resistor is reduced to a minimum. Such condition of the resistor corresponds to maximum sensitivity of a film in the magazine chamber, i.e., the resistor causes the arm 11 to maintain the diaphragm in a position in which the diaphragm defines an effective aperture of minimum size. If the operator wishes to deenergize the circuit of the exposure meter, the magazine 16 is removed and the locking member 38 is moved downwardly so as to place the index 35 into registry with the lower reference mark 37. The spring 31 then moves the detector 23' to lower end position and the slider 42 moves downwardly and beyond the layer 41 to engage the insulator 40 and to thus interrupt the flow of current through the variable resistor. Such position of the slider 42 is indicated in FIG. 5 by broken lines. The manner in which the resistance of the variable resistor changes in response to insertion of magazines containing film of different sensitivity is the same as described in connection with FIGS. 1 to 3. Thus, the variable resistor 40—42 replaces the filter 28 and the control switch 13.

We claim:

1. In a photographic apparatus for use with film magazines of the type provided with coding means indicative of the sensitivity of film therein, a combination comprising a housing including a magazine chamber having a door movable between open and closed position; adjustable exposure meter means provided in said housing and arranged to assume operative and inoperative conditions; detector means for scanning said coding means, said detector means being movable from a starting position to one of a plurality of intermediate positions in each of which said detector means adjusts said exposure meter means as a function of the sensitivity of film in the respective magazine in said chamber, and to an end position when said chamber is unoccupied; control means operated by said detector means to place said exposure meter means into operative condition in the starting and intermediate positions of said detector means and to place said exposure meter means into inoperative condition in the end position of said detector means; and locking means actuatable to lock and unlock said door in closed position, said detector means being movable by said locking means from said end position to another of said positions thereof in response to at least partial unlocking of said door so that said exposure meter means can assume said operative condition when said chamber is unoccupied.

2. A combination as defined in claim 1, wherein said exposure meter means comprises an electric circuit which is completed in the operative condition and is deenergized in the inoperative condition of said exposure meter means, said control means comprising an electrical component arranged to complete said circuit in said starting and intermediate positions of said detector means and to deenergize said circuit in the end position of said detector means.

3. A combination as defined in claim 2, wherein said electrical component is a switch which is normally closed and is opened by said detector means in response to movement of said detector means to said end positions.

4. A combination as defined in claim 1, wherein said electrical component comprises variable resistor means which completes said circuit in the starting and intermediate positions of said detector means and deenergizes said circuit in the end position of said detector means.

5. A combination as defined in claim 4, wherein said variable resistor means comprises a stationary portion and a second portion connected with and movable by said detector means to engage said stationary portion in the starting and intermediate positions of said detector means and to be disengaged from said stationary portion in the end position of said detector means.

6. A combination as defined in claim 5, wherein said variable resistor means further comprises an insulator which is engaged by said second portion in the end position of said detector means.

7. A combination as defined in claim 1, further comprising means for indicating the condition of said exposure meter means.

8. A combination as defined in claim 7, further comprising window means, said exposure meter means comprising a movable output member and said indicator means comprising pointer means connected with said output member and being observable in said window means.

9. A combination as defined in claim 8, further comprising view finder means including said window means.

10. In a photographic apparatus for use with film magazines of the type provided with coding means indicative of the sensitivity of film therein, a combination comprising a housing including a magazine chamber; adjustable exposure meter means provided in said housing and arranged to assume operative and inoperative conditions; detector means for scanning said coding means, said detector means being movable from a starting position to one of a plurality of intermediate positions in each of which said detector means adjusts said exposure meter means as a function of the sensitivity of film in the respective magazine in said chamber, said detector means being further movable to an end position when said chamber is unoccupied; control means operated by said detector means to place said exposure meter means into operative condition in the starting and intermediate positions of said detector means and to place said exposure meter means into inoperative condition in the end position of said detector means; manually operated means for effecting movement of said detector means from said end position when said chamber is unoccupied; and means for indicating the condition of said exposure meter means, comprising a pointer connected with said detector means.

11. A combination as defined in claim 10, further comprising a window provided in said housing, said pointer being in registry with said window in the end position of said detector means.